United States Patent
Liu

(10) Patent No.: US 9,436,604 B2
(45) Date of Patent: Sep. 6, 2016

(54) SYSTEM AND METHOD FOR SOFTWARE/HARDWARE COORDINATED ADAPTIVE PERFORMANCE MONITORING

(71) Applicant: FutureWei Technologies, Inc., Plano, TX (US)

(72) Inventor: Fuling Liu, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 290 days.

(21) Appl. No.: 13/801,141

(22) Filed: Mar. 13, 2013

(65) Prior Publication Data
US 2014/0281235 A1    Sep. 18, 2014

(51) Int. Cl.
*G06F 12/08*    (2016.01)
*G06F 11/34*    (2006.01)

(52) U.S. Cl.
CPC ....... *G06F 12/0811* (2013.01); *G06F 11/3409* (2013.01); *G06F 2212/1044* (2013.01); *G06F 2212/601* (2013.01)

(58) Field of Classification Search
CPC ........... G06F 12/0811; G06F 11/3409; G06F 2201/885
See application file for complete search history.

(56) References Cited

U.S. PATENT DOCUMENTS

| | | | |
|---|---|---|---|
| 6,449,663 B1 * | 9/2002 | Carney et al. | 710/15 |
| 2002/0183972 A1 * | 12/2002 | Enck | G06F 11/3409 702/186 |
| 2009/0327609 A1 * | 12/2009 | Fleming et al. | 711/118 |
| 2010/0268912 A1 | 10/2010 | Conte et al. | |

FOREIGN PATENT DOCUMENTS

| | | |
|---|---|---|
| CN | 101252499 A | 8/2008 |
| CN | 101719080 A | 6/2010 |

OTHER PUBLICATIONS

International Search Report received in PCT/CN2014/073366, mailed Jun. 13, 2014, 12 pages.

* cited by examiner

*Primary Examiner* — Edward Dudek, Jr.
(74) *Attorney, Agent, or Firm* — Slater Matsil, LLP

(57) ABSTRACT

System and method embodiments are provided for coordinated hardware and software performance monitoring to determine a suitable polling time for memory cache during run time. The system and method adapt to the time-varying software workload by determining a next polling time based on captured local characteristics of memory access pattern over time. The adaptive adjustment of polling time according to system performance and dynamic software workload allows capturing more accurately the local characteristics of memory access pattern. An embodiment method includes capturing, at a current polling instance, hardware performance parameters to manage the memory cache, and adjusting a time interval for a next polling instance according to the hardware performance parameters. The captured hardware performance parameters are used to compute performance metrics, which are then used to determine the time interval for the next polling instance.

15 Claims, 2 Drawing Sheets

SYSTEM AND METHOD FOR SOFTWARE/HARDWARE COORDINATED ADAPTIVE PERFORMANCE MONITORING

TECHNICAL FIELD

The present invention relates to a system and method for processor optimization, and, in particular embodiments, to a system and method for software/hardware coordinated adaptive performance monitoring.

BACKGROUND

Processor performance for computing systems has been improving at a faster rate than memory system performance. The disproportional clock speed between processor and memory makes memory the bottleneck to processor performance. To mitigate the effect of slow memory to processor performance, cache is used to store small data closer to the processor at a comparable speed with the processor. Modern processors implement performance monitoring circuitry in hardware and provide performance counters for software to poll (read). To take the advantage of the locality pattern (local characteristics or behavior) of memory access, the operating system polls hardware performance counters periodically and manages cache accordingly. Polling hardware counters to manage cache has overhead cost in terms of polling time (or the number of cycles used for polling). The polling time may be too small to show a locality or too long averaging out localities. Determining a suitable polling time is difficult due to the dynamic nature of software workload. There is a need for an improved method for monitoring hardware performance in a manner adaptive to the dynamic software workload nature.

SUMMARY OF THE INVENTION

In one embodiment, a method for adaptive performance monitoring to manage memory cache of a processing system includes capturing, at a current polling instance, hardware performance parameters to manage the memory cache, and adjusting a time interval for a next polling instance according to the hardware performance parameters.

In another embodiment, a method for adaptive performance monitoring to manage memory cache of a processing system includes polling, at a current polling instance, processor counters to manage last level cache (LLC), computing performance metrics according to the processor counters, determining whether to enable adaptation of polling processor counters according to the performance metrics, and upon determining to enable adaptation, adjusting a time interval for a next polling instance according to the performance metrics.

In yet another embodiment, an apparatus configured for adaptive performance monitoring to manage memory cache of the apparatus. The apparatus includes a multi-core processor, a multi-level cache, and a computer readable storage medium storing programming for execution by the multi-core processor. The programming includes instructions to poll performance counters of the multi-core processor at each of a plurality of subsequent instances, manage the multi-level cache using the performance counters, and adjust a time interval for polling the performance counters at a next instance according to the performance counters captured at a last instance.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
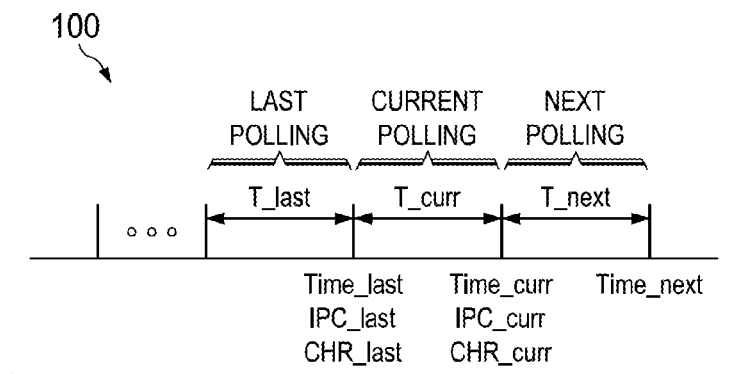
FIG. 1 illustrates an embodiment of an adaptive performance monitoring timing diagram.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

For multi-core processors, memory hierarchies with multiple levels of cache are used to improve the caching performance. In a hierarchical memory system, last level cache (LLC) is accessed simultaneously by multiple cores. This is implemented by partitioning the LLC among the cores. When multiple cores access the same cache line, contention may occur. Contention may halt or slow the execution of the software and may also eject the previously cached data from the cache line. The partitioning of the LLC impacts the cache contention rate. However, since the software workload is not static, LLC fixed partitioning may not be an optimal solution, for example over an extended period of time. Dynamic cache partitioning according to time-varying workload can give an improved cache performance, e.g., if the partitioning is in accordance to software access pattern to memory over time.

System and method embodiments are provided for coordinated hardware and software performance monitoring to determine a suitable polling time for the cache, e.g., in real time while software is running. The system and method adapt to the time-varying software workload by determining a next polling time based on captured local characteristics of memory access pattern over time, which reflect the time-varying nature of workload. The adaptive adjustment of polling time according to system performance and dynamic software workload allows capturing more accurately the local characteristics of memory access pattern. Specifically, an adaptive algorithm is implemented to determine an optimal polling time, e.g., for each subsequent polling interval, to capture hardware performance counters that accurately reflect the locality pattern of memory access during each time interval. The accurately captured counters can then used by the operating system to effectively manage cache and hence improve system performance. For instance, the captured performance counters are used to efficiently partition LLC for multi-core systems and hence reduce contention among the cores.

According to the algorithm, after the operating system polls the performance counters from hardware, the operating system computes a set of performance metrics using the polled information. The hardware performance counters that are polled or read by the operating system may include performance statistics, such as the number of clock cycles elapsed per core since the last poll, the number of executed instructions per process core, and the number of cache hits and misses for each cache at every cache level. The performance metrics computed by the operating system include an average number of executed instructions per cycle (IPC), a cache hit ratio (CHR), and other metrics calculated from the IPC and CHR.

The adaptive algorithm then uses the computed performance metrics to estimate an optimal or best suitable timing to poll the performance counter for next time (e.g., in a periodic or recurring manner while software is running). FIG. 1 shows an adaptive performance monitoring timing diagram 100 according to the adaptive algorithm. The timing diagram 100 shows two most recent polling time instances (for last polling and current polling) and the estimated next polling time instance (next polling). Table 1 below summarizes the parameters of the timing scheme 100. The parameter T_curr is the time interval between the most recent and the second most recent polls. The parameter T_last is the time interval between the second and third most recent polls. The parameter T_next is the estimated time (as described further below) interval from the most recent (e.g., current) poll. The parameter T_next is used to determine when to poll the performance counters next time. The parameters Time_last and Time_curr are the times when these two most recent polls are taken. The relationship between these two parameters is Time_curr=Time_last+T_curr. The parameter Time_next is the estimated time to poll the hardware performance counter next time, where Time_next=Time_curr+T_next. The parameter IPC_last and IPC_curr are the two most recent overall IPC for all cores. The parameters CHR_last and CHR_curr are the two most recent CHRs of LLC.

TABLE 1

| Parameter description | Second most recent poll | Most recent poll | Projected next poll |
|---|---|---|---|
| Time interval from previous poll | T_last | T_curr | T_next |
| Polling time instance | Time_last | Time_curr | Time_next |
| IPC statistics | IPC_last | IPC_curr | |
| CHR statistics | CHR_last | CHR_curr | |

The IPC and CHR are computed based on the values polled from the hardware performance counters. For instance, the IPC can be computed using the following pseudo-code or any equivalent algorithm:

```
// N is number of cores
int   instruction_count[N]; // number of executed instructions
int   cycle_count[N];    // number of clock cycles between 2 polls
int   j;
float IPC = 0;
for (j = 0 ; j < N; j++ )
{
   IPC = IPC + (float) (instruction_count[j] / cycle_count[j]);
}.
```

The CHR can be computed using the following pseudo-code or any equivalent algorithm:

```
int  hit_count;    // number of last level cache hits between 2 polls
int  miss_count;   // number of last level cache misses between 2 polls
int  access_count = hit_count + miss_count;
float CHR = (float) (hit_count / access_count).
```

The IPC and CHR are the performance statistics at a particular polling time instance. They are compared against their average or their long term averaged value (IPC_avg and CHR_avg) and their maximum value (IPC_max and CHR_max). The average or long term averaged performance statistics, IPC_avg and CHR_avg, are computed by averaging all or a plurality of past performance statistics with different weights. The weighting is controlled by two factors, referred to herein as forgetting factors: $\alpha$ for IPC and $\beta$ for CHR that are configurable by the system or programmable by a user. The forgetting factors can be in the range of 0 to 1. The metrics or statistics IPC_avg, IPC_max, CHR_avg, and CHR_max can be computed using the following pseudo-code or any equivalent algorithm:

```
float IPC, IPC_avg, IPC_max;
float CHR, CHR_avg, CHR_max;
IPC_avg = α * IPC + (1− α) * IPC_avg;
if( IPC_avg > IPC_max) IPC_max = IPC_avg;
CHR_avg = β * CHR + (1− β) * CHR_avg;
if( CHR_avg > CHR_max) CHR_max = CHR_avg.
```

Additionally, a cost function for quantitatively measuring the performance of the algorithm can be computed based on two most recent IPC and CHR. Since IPC and CHR are two different types of measurements, a cost function ($\Delta$_cost) is designed to linearly combine the normalized IPC and CHR into one quantity. The distribution of the cost function between IPC and CHR is controlled by the cost function weighting factor ($\gamma$) which is configurable by the system or programmable by a user. The cost function can be computed using the following pseudo-code or any equivalent algorithm:

```
Δ_IPC = (IPC_curr − IPC_last) / IPC_last;
Δ_CHR = (CHR_curr − CHR_last) / CHR_last;
Δ_cost = γ * Δ_IPC + (1− γ) * Δ_CHR.
```

The adaptive algorithm determines when to enable or disable adaptation to the metrics or statistics above based on the cost function. Further, a hysteresis factor or count can also be used, optionally (e.g., in some scenarios or cases), to prevent this adaptation from oscillation (e.g., undergoing large changes from one computation instance to another). The hysteresis count (HYST) is configurable by the system or programmable by a user. The hysteresis factor allows the system to settle (or stabilize) before the next round of adaptation. The cost function and the hysteresis factor can be used in the algorithm as in the following pseudo-code or any equivalent algorithm:

```
int    count;   // number of consecutive cost function with the same sign
int    HYST;   // hysteresis programmed by the user
bool adapt_enable;
// update hysteresis counter
if(Δ_cost_prev >= 0 && Δ_cost >= 0)            count = count + 1;
else if (Δ_cost_prev <= 0 && Δ_cost <= 0)      count = count + 1;
else                                           count = 0;
// determine whether to enable or disable adaptation
if( hysteresis_feature_enabled && count > HYST)   adapt_enable =
                                                  TRUE;
else                                              adapt_enable =
                                                  FALSE;
// save cost function for next time
Δ_cost_prev = Δ_cost.
```

Depending on the aggressiveness desired for adaptation, one of two schemes for adaptive polling can be used: a fast adaptation and slow adaptation. The fast adaptation adapts polling time aggressively by changing T_next, which enables the system to relatively quickly converge to the change in workload at the expense of potential oscillation in the system. In comparison, the slow adaptation adapts polling time conservatively or in a slower manner by changing T_next. Therefore, the slow adaptation can be more stable but may not catch up (quickly enough) to the change in workload.

The system or a user can set fast and slow adaptation criteria by the use of two thresholds (THRSH_fast and THRSH_slow) which are configurable by the system or programmable by the user. For fast adaptation, the adaptation speed can be controlled with a scaling factor ($\mu$) which is configurable by the system or programmable by the user. For slow adaptation, the system or user can control the adaptation speed with a step size ($\delta t$), which is configurable by the system or programmable by the user. The algorithm can adapt the polling time by estimating or changing the time interval for next polling (T_next) according to the change of the performance cost function using the following pseudo-code or any equivalent algorithm:

```
float  THRSH_fast;   // fast adaptation threshold, programmable
float  THRSH_slow;   // slow adaptation threshold, programmable
float  μ;            // fast adaptation scaling factor, programmable
float  δt;           // slow adaptation step size, programmable
if( adapt_enable == TRUE )
{
  if( fabs(Δ_cost) >= THRSH_fast )
    T_next = T_curr + μ * Δ_cost;
  else if(fabs(Δ_cost) >= THRSH_slow )
  {
    if( Δ_cost >= 0 ) T_next = T_curr + δt;
    else              T_next = T_curr - δt;
  }
  else
    T_next = T_curr;
}
else
{
  T_next = T_curr; // adaptation is disabled
}.
```

If the system becomes unstable, the algorithm can be reset and the adaptation can be subsequently re-started. The system or user can control the sensitivity in detecting the system stability with two thresholds: one for IPC (THRSH_IPC) and the other for CHR (THRSH_CHR). Both thresholds are configurable or programmable. The algorithm can detect divergence or false adaptation, which may reflect unstable conditions, using the following pseudo-code or any equivalent algorithm:

```
float  THRSH_IPC;   // IPC divergence threshold, programmable
float  THRSH_CHR;   // CHR divergence threshold, programmable
bool adapt_reset;
if( IPC_avg < IPC_max * THRSH_IPC &&
    CHR_avg < CHR_max * THRSH_CHR)
  adapt_reset = TRUE;
else
  adapt_reset = FALSE;
```

Figure 2:
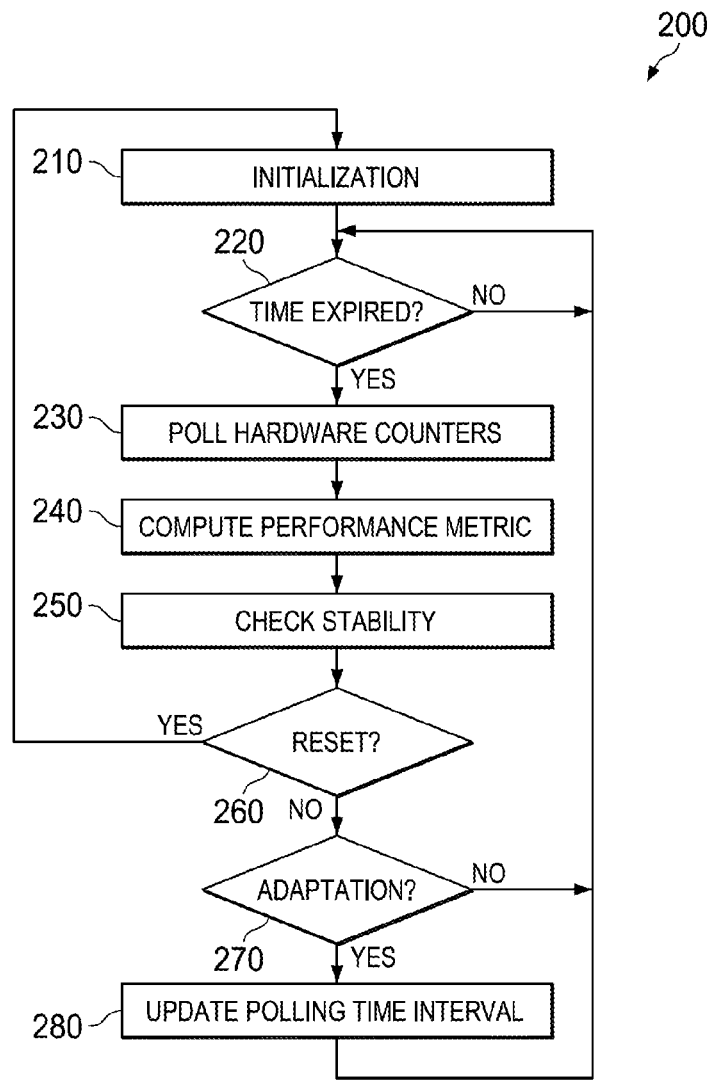
FIG. 2 illustrates an embodiment method of an adaptive performance monitoring algorithm.

FIG. 2 shows an embodiment method 200 of the adaptive performance monitoring algorithm. The method 200 may be implemented by the adaptive performance monitoring system each time the polling timer expires at step 220. A first initialization step 210 can precede the step 220, where different parameters and values of the algorithm may be reset. The initialization or resetting step may include resetting the time interval for next polling to a pre-determined value (e.g., 10 milliseconds). The timer expiration is controlled by the polling time interval. At step 230, the algorithm polls the hardware performance counters. At step 240, a set of performance metrics are computed. At step 250, the stability of the system is checked. At step 260, the method 200 determines whether a reset is needed if the system is unstable. If the system is found unstable, then the algorithm is reset and the method 200 returns to step 210. Otherwise, the method 270 proceeds to step 270 to determine whether to enable or disable adaptation, e.g., based on the stability check. If the method 200 decides to enable adaptation, then the method 200 proceeds to step 280 to update the polling time interval for next poll, e.g., based on the metrics as described above. Otherwise, the method 200 keeps the same polling time interval and returns to step 220.

Figure 3:
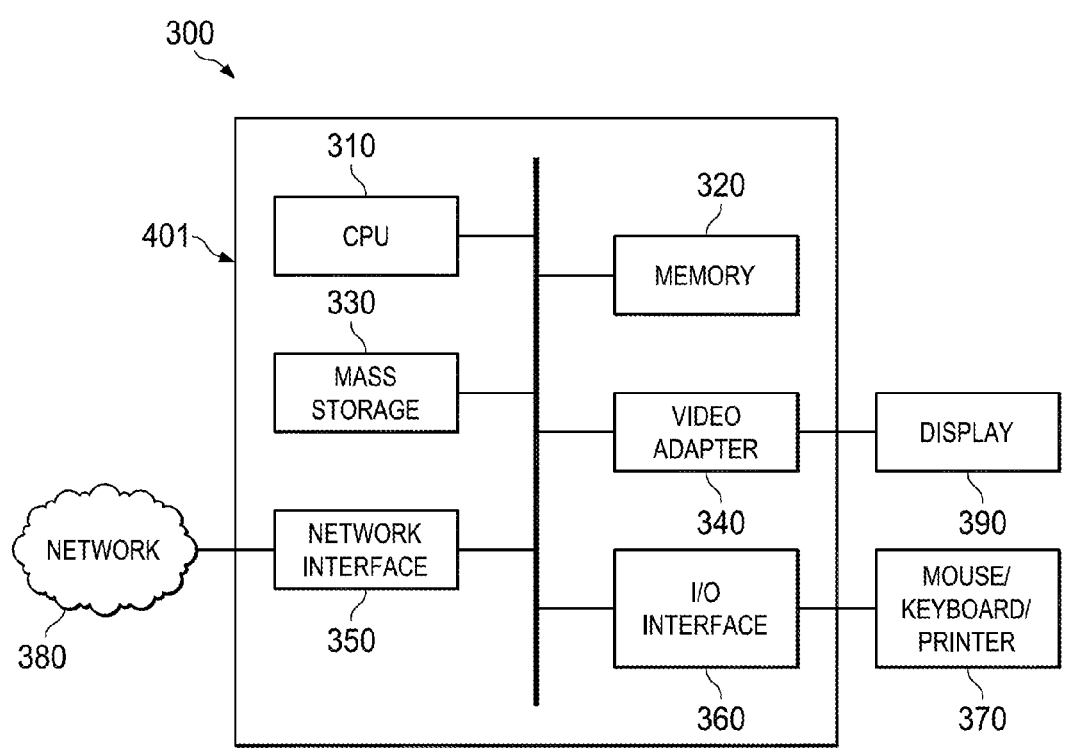
FIG. 3 is a block diagram of a processing system that can be used to implement various embodiments.

FIG. 3 is a block diagram of a processing system 300 that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 300 may comprise a processing unit 301 equipped with one or more input/output devices, such as a speaker, microphone, mouse, touchscreen, keypad, keyboard, printer, display, and the like. The processing unit 301 may include a central processing unit (CPU) 310, a memory 320, a mass storage device 330, a video adapter 340, and an I/O interface 360 connected to a bus. The bus may be one or more of any type of several bus architectures including a memory bus or memory controller, a peripheral bus, a video bus, or the like.

The CPU 310 may comprise any type of electronic data processor. The memory 320 may comprise any type of system memory such as static random access memory (SRAM), dynamic random access memory (DRAM), synchronous DRAM (SDRAM), read-only memory (ROM), a combination thereof, or the like. In an embodiment, the memory 320 may include ROM for use at boot-up, and DRAM for program and data storage for use while executing programs. In embodiments, the memory 320 is non-transitory. The mass storage device 330 may comprise any type of storage device configured to store data, programs, and other information and to make the data, programs, and other information accessible via the bus. The mass storage device 330 may comprise, for example, one or more of a solid state drive, hard disk drive, a magnetic disk drive, an optical disk drive, or the like.

The video adapter 340 and the I/O interface 360 provide interfaces to couple external input and output devices to the processing unit. As illustrated, examples of input and output devices include a display 390 coupled to the video adapter 340 and any combination of mouse/keyboard/printer 370 coupled to the I/O interface 360. Other devices may be coupled to the processing unit 301, and additional or fewer interface cards may be utilized. For example, a serial interface card (not shown) may be used to provide a serial interface for a printer.

The processing unit 401 also includes one or more network interfaces 450, which may comprise wired links, such as an Ethernet cable or the like, and/or wireless links to access nodes or one or more networks 480. The network interface 450 allows the processing unit 401 to communicate with remote units via the networks 480. For example, the network interface 450 may provide wireless communication via one or more transmitters/transmit antennas and one or more receivers/receive antennas. In an embodiment, the processing unit 401 is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for adaptive performance monitoring to manage memory cache of a processing system, the method comprising:
capturing, at a current polling instance, hardware performance parameters to manage the memory cache;
adjusting a time interval for a next polling instance according to the hardware performance parameters; and
resetting the time interval to a pre-determined value upon determining that the hardware performance parameters reflect unstable system conditions according to at least one of a number of instructions per cycle (IPC) and a cache hit ratio (CHR), wherein adjusting the time interval comprises estimating the time interval based on the current polling instance and a previous polling instance.

2. The method of claim 1, further comprising:
computing performance metrics using the hardware performance parameters; and
determining the time interval according to the performance metrics.

3. The method of claim 2, further comprising detecting system stability according to the performance metrics.

4. The method of claim 3, further comprising using for the next polling instance a last configured time interval upon determining that the performance metrics reflect an unstable condition.

5. A method for adaptive performance monitoring to manage memory cache of a processing system, the method comprising:
polling, at a current polling instance, processor counters to manage last level cache (LLC);
computing performance metrics according to the processor counters;
determining whether to enable adaptation of polling processor counters according to the performance metrics;
upon determining to enable adaptation, adjusting a time interval for a next polling instance according to the performance metrics; and
resetting the time interval for next polling to a pre-determined value and the performance metrics upon determining unstable system conditions beyond at least one a threshold of instructions per cycle and a cache hit ratio threshold,
wherein the processor counters include an instruction count and a cycle count per each processor core and a hit count and a miss count of LLC hits between last two polling instances,
wherein the performance metrics include executed instructions per cycle (IPC) computed as a sum of ratios of the instruction count to the cycle count of all processor cores, and a cache hit ratio (CHR) computed as a ratio of the hit count to a sum of the hit count and the miss count, and
wherein the performance metrics further include a cost function computed as a weighted sum of an IPC difference and a CHR difference between last two polling instances.

6. The method of claim 5, wherein the performance metrics further include a hysteresis count incremented according to cost functions for last two polling instances, and wherein the adaptation of polling is enabled when the hysteresis count is above a threshold.

7. The method of claim 6, wherein the hysteresis count is incremented when both cost functions of the last two polling instances have the same sign.

8. The method of claim 5, wherein the time interval is adjusted using a faster adaptation option from two adaptation schemes that allows a faster convergence to change in workload on the LLC.

9. The method of claim 8, wherein the faster adaptation option adjusts the time interval for the next polling instance by adding the cost function weighted by a scaling factor to a current time interval for the current polling instance.

10. The method of claim 5, wherein the time interval is adjusted using a slower adaptation option from two adaptation schemes that allows a more stable convergence to change in workload on the LLC.

11. The method of claim 10, wherein the slower adaptation option adjusts the time interval for the next polling instance by adding or subtracting the cost function weighted by a scaling factor to a current time interval for the current polling instance.

12. An apparatus configured for adaptive performance monitoring to manage memory cache of the apparatus, the apparatus comprising:
a multi-core processor;
a multi-level cache; and
a computer readable storage medium storing programming for execution by the multi-core processor, the programming including instructions to:
poll performance counters of the multi-core processor at each of a plurality of subsequent instances;
manage the multi-level cache using the performance counters;
adjust a time interval for polling the performance counters at a next instance according to the performance counters captured at a last instance; and
reset the time interval to a predetermined value upon determining the performance counters reflect unstable system conditions according to at least one of a number of instructions per cycle (IPC) and a cache hit ratio (CHR), wherein the instruction to adjust the time interval comprises to estimate the time interval based on a current polling instance and a previous polling instance.

13. The apparatus of claim 12, wherein the programming further includes instructions to:
compute performance metrics using the performance counters; and
determine the time interval according to the performance metrics.

14. The apparatus of claim 13, wherein the performance counters of the multi-core processor include an instruction count and a cycle count per each core in the multi-core processor and a hit count and a miss count of last level cache (LLC) hits in the multi-level cache between last two polling instances.

15. The apparatus of claim 14, wherein the performance metrics include executed the IPC equal to a sum of ratios of the instruction count to the cycle count of all cores in the multi-core processor, and the CHR equal to a ratio of the hit count to a sum of the hit count and the miss count.

\* \* \* \* \*